Feb. 13, 1973   KOICHI TAKAHASHI   3,716,314
ROTARY MOTION DEVICE

Filed Dec. 10, 1971   5 Sheets-Sheet 1

INVENTOR
KOICHI TAKAHASHI
BY
ATTORNEY

Feb. 13, 1973  KOICHI TAKAHASHI  3,716,314
ROTARY MOTION DEVICE

Filed Dec. 10 1971  5 Sheets-Sheet 4

INVENTOR

KOICHI TAKAHASHI

BY *John Lyoley*

ATTORNEY

Feb. 13, 1973 KOICHI TAKAHASHI 3,716,314
ROTARY MOTION DEVICE
Filed Dec. 10 1971 5 Sheets-Sheet 5

INVENTOR

KOICHI TAKAHASHI

BY
ATTORNEY

United States Patent Office 3,716,314
Patented Feb. 13, 1973

3,716,314
ROTARY MOTION DEVICE
Koichi Takahashi, Yokohama, Japan, assignor to Nissan Motor Company, Limited, Yokohama, Japan
Filed Dec. 10, 1971, Ser. No. 206,695
Claims priority, application Japan, Dec. 16, 1970, 45/112,735
Int. Cl. F04f 3/00
U.S. Cl. 418—150
13 Claims

ABSTRACT OF THE DISCLOSURE

Herein proposed is an improved rotary motion device such as a rotary engine using a usually three-lobed rotor which rotates about its center and revolves around a center of a contoured chamber in a center housing. The chamber has an internal contour generated from a two-linked curve which is made up of a pair of symmetrical component curves joined together through straight or nearly straight segments so that the lobes of the rotor is permitted to pass through the junction points without change in sign of the acceleration at the lobe portions of the rotor as is encountered in the prior art rotary motion devices using an epitrochoidally contoured chamber. This will contribute to improving the sealing between the lobes and the contacting surface of the center housing while providing wide selection of the gear configurations.

---

The present invention relates to rotary motion devices such as engines, pumps and motors which operate on rotary motion principles.

The rotary motion device to which the present invention is directed generally includes a chamber structure which is formed with a contoured chamber and a rotor which is slidably received within the contoured chamber. This contoured chamber is configured in a manner that its internal contour is defined by a continuous closed curve while the rotor has an appropriate number of equidistantly and equiangularly spaced lobes or apices at its external contour. The rotor is not only rotatable about its own center but concurrently revolvable around a center of the contoured chamber with the lobes constantly in sliding contact with the surrounding internal wall surface of the contoured chamber. An externally toothed gear with a given external contour is held stationary relative to the chamber structure and an internally toothed gear is formed on or secured to the rotor so that the two gears are in constant mesh with each other. As the rotor rotates about its center and revolves around the center of the contoured chamber, the internally toothed gear moves, together with the rotor, on the mating externally toothed stationary gear whereby the lobes or apices of the rotor, which are constantly in sliding contact with the wall of the contoured chamber, trace a given locus curve which is in unison with the curve defining the contour of the contoured chamber.

Where the rotary motion device having such general construction is to be used as the rotary type internal combustion engine such as for motor vehicles, the contractible spaces defined by the side walls intermediate between adjacent two of the lobes or apices of the rotor and the surrounding wall of the contoured chamber serve as combustion chambers one after another in which a combustible mixture is compressed, ignited and expanded. In this instance, the chamber structure is constituted by a center or rotor housing and an engine output shaft is connected to the rotor at the center of the contoured chamber.

Typical of the rotary piston engines thus constructed will be the Wankel rotary engines which have recently been commercialized.

The Wankel rotary engine has a contoured chamber having an internal contour which results from a pair of component epitrochoid curves respectively generated from two identical base circles and a rotor having an external contour resulting from an epitrochoid inner envelope. The rotary engine of this type offers mechanical advantages and simplicity of construction over the prior art reciprocating-piston engines and, as such, is expected to be widely accepted in the motor vehicle industry. A drawback is, however, pointed out by those skilled in the art in connection with the sealing between the lobes or apices of the rotor and the surrounding internal wall of the contoured chamber, viz, the gas-tightness of the combustion chambers. This can be traced, among other things, to the lack of uniformity in the movements of the lobe portions of the rotor and to the fact that the acceleration at each of the lobe portions changes its sign, say from positive to negative, at a moment when the lobe passes through those points of the internal wall of the contoured chamber which correspond to the points at which one component curve is linked to the other.

An object of the present invention is, therefore, to provide a rotary motion device, such as for example a rotary engine, of the described general construction but offering improved sealing characteristics between the lobes of the rotor and the contacting internal wall of the contoured chamber.

Another object of the invention is to provide a rotary motion device of the described general construction, in which the movements of the lobes of the rotor relative to the contoured chamber are comparatively stabilized especially at a moment when the lobes pass through the points at which the two component curves defining the wall of the contoured chamber merge into each other.

Still another object is to provide a rotary motion device of the described general construction, in which the acceleration at each of the lobes of the rotor does not change or, at most changes satisfactorily moderately, its sign at the instant the lobe pass through the points of the internal wall of the contoured chamber which correspond to the linking points of the component contour curves of the wall.

Still another object is to provide a rotary motion device of the described general construction, in which the internal contour of the contoured chamber is defined by a non-epitrochoid curve.

These objects of the present invention are accomplished in a rotary motion device, such as a rotary engine, in which the closed curve defining the internal contour of the contoured chamber consists of substantially congruent and symmetrical component curves which are jointed together through substantially straight segments. The number of such component curves is smaller by one than the number of the lobes or apices of the rotor. In this instance, the externally toothed stationary gear on which the rotor moves may have an external contour which results from a generally non-circular curve such as a quasi-elliptical curve having a center which is common to the center of the contoured chamber. The internally toothed gear integral with the rotor, on the other hand, has an internal contour which results from a closed, generally non-circular curve. It is to be understood that any closed circular curve which is eccentric with respect to the center of the rotor may be included in the category of the non-circular curve which is herein referred to.

In contrast to the Wankel rotary engine in which the stationary and rotary or externally toothed and internally toothed gears respectively have external and internal contours resulting from certain circles, wide selection is provided of the configurations of the externally and internally toothed gears incorporated in the rotary motion device according to the present invention. If, as above mentioned, the externally toothed stationary gear is to be configured as having a quasi-elliptical external contour, the curvature which may occur at each of those points of the contoured chamber which correspond to the junction points of the two component contour curves of the chamber, thereby to contribute to lessening the variation in the acceleration to which the lobes of the rotor are subject.

The nature and theoretical background of the rotary motion device in accordance with the present invention will become more apparent from the following detailed description taken in conjunction with the accompanying drawings, in which.

In order that the theoretical aspects of the rotary motion device according to the present invention be fully understood, necessary conditions to meet the mechanical requirements of the rotary motion device in general will be first obtained by a mathematical approach to the complex motions of the rotary engines. Next, discussion will be given to the geometrical behaviours of the lobes or apices of the rotor so as to provide the mathematical grounds on which the generating curve for the contour curve of the contoured chamber is to be determined. The locus curve of the apices of the rotor will then be considered on such mathematical grounds so as to find the generating curve for the contoured chamber of the rotary motion device embodying the present invention. The contour curve of the contoured chamber will be determined in this manner and this, in turn, will determine the contour curves of the externally and internally toothed gears of the device because the former curve is predominant over the latter curves. Consideration will next be made on the locus curve of the apices of the rotor by aid of the thus given contour curves of the gears. Such consideration will lead to determination of the external contour of the rotor of the rotary motion device according to the present invention. Last, the acceleration at various points of the rotor during operation will be examined also through mathematical observation for thereby clearly showing the advantages of the rotary motion device according to the present invention over the prior art counterparts such as the Wankel rotary engine using the epitrochoidally contoured chamber.

REQUIREMENTS OF MECHANISM

For the sake of simplicity for consideration, the operation of the Wankel rotary engines can be essentially broken down to two kinds of different yet concurrent motions, one of which is the revolution or crank motion of a center of the rotor around the output shaft of the engine and the other of which is the rotation of the rotor about its own center.

Figure 1:
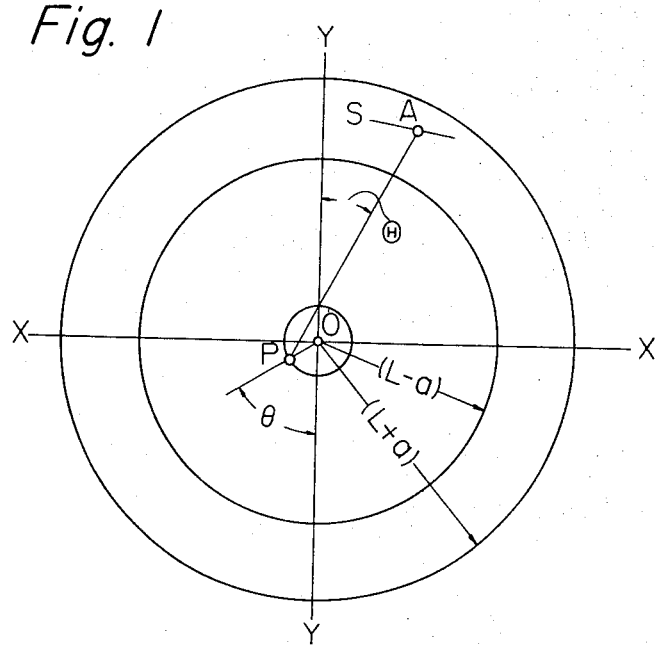
FIG. 1 is a diagram showing a region within which the apices of the rotor of the rotary motion device in general are movable.

If, thus, the output shaft of the Wankel rotary engine has its center at a point O and the rotor has its center at a point P, as labelled in FIG. 1, then the point P will rotate about the point O. If, furthermore, the rotor has one of its multiplicity of species located at a point A at a given instant and if the length of the line segment joining the points O and P, i.e., the radius of the crank is denoted by $a$ and the length of the line segment joining P and A, i.e., the distance between the center and one of the apices of the rotor is denoted by L, the point A will then move within an annular region which is defined by two concentric circles having radii of $(L+a)$ and $(L-a)$ and a common center O. This point A is permitted to arbitrarily move around anywhere in a fixed plane within this particular region and can therefore follow a given curve which is designated by S in FIG. 1.

If, now, orthogonal $xy$-coordinates with an origin at point O is introduced and if an angle which the line segment $\overline{OP}$ makes with the negative $y$-axis and an angle which the line segment $\overline{PA}$ makes with the positive $y$-axis are represented by $\theta$ and $\Theta$, respectively, then the coordinates (X, Y) of the point P are given by $$X = -a \cdot \sin \theta + L \cdot \sin \Theta$$
$$Y = -a \cdot \cos \theta + L \cdot \cos \Theta \qquad \text{(Eq. 1)}$$

Hence, the curve S may be expressed in the form of $Y = F(X)$. If, therefore, a curve to be predominant over the relation $Y = F(X)$ is initially given, then a relation expressed in the form of $\Theta = f(\theta)$ will be readily deduced from Eq. 1, thereby yielding a mechanism in which the relation $\Theta = f(\theta)$ is established between the angles $\Theta$ and $\theta$. When, conversely, the relation $\Theta = f(\theta)$ is initially given, then there immediately result $X = X(\theta)$ and $Y = Y(\theta)$ so that the required curve S can be determined which contains $\theta$ as a parameter.

Figure 2:
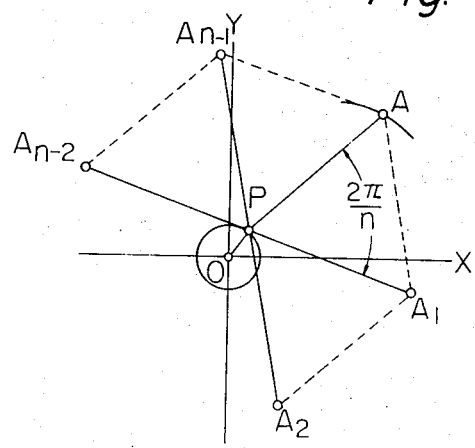
FIG. 2 is a diagram showing the positional relationship between the apices of the rotor which is exemplified as having the apices situated on the vertices of an $n$-sides polygon.

Suppose, in general, the rotor has an $n$ number of species as denoted by A, $A_1$, $A_2$, ... $A_{n-1}$, these species will construct a regular polygon having a center at point P as seen in FIG. 2. It is, in this instance, important that when one of these multiplicity of species traces a certain curve which may be the curve S drawn by point A then all of the remaining $n-1$ number of species must lie on that particular curve under any circumstances. From this, it follows that if the coordinates $(X_i, Y_i)$ of the $i$th apex are expressed in terms of the angles $\theta$ and $\Theta$, they will be written $$X_i = -a \cdot \sin \theta + L \cdot \sin \left(\Theta + i \frac{2\pi}{n}\right)$$

$$Y_i = -a \cdot \cos \theta + L \cdot \cos \left(\Theta + i \frac{2\pi}{n}\right)$$

and $$Y_i = F(X_i) \qquad \text{(Eq. 2)}$$

in which $i = 0, 1, 2, \ldots (n-1)$.

Figure 3:
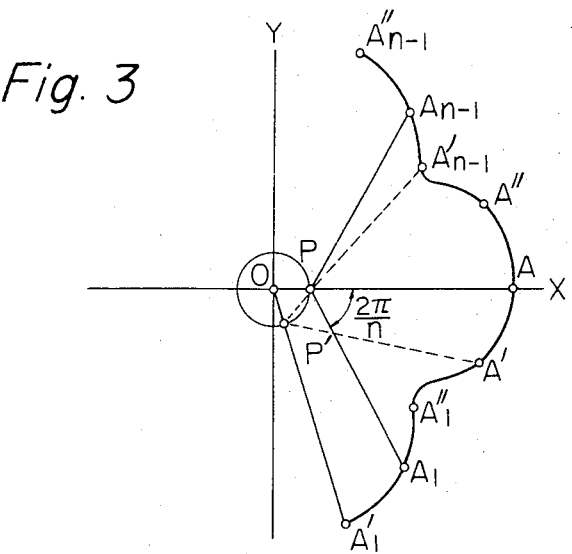
FIG. 3 is a diagram showing the path or locus curve of the apices of the rotor which is assumed to have an $n$ number of apices.

At the instant when point A is situated on the positive $x$-axis and is farthest from point O, the point P of the crank must lie on the line segment joining points O and A, as illustrated in FIG. 3. Since, under this condition, points $A_1$ and $A_{n-1}$ are laid off at $-2\pi/n$ and $2\pi/n$, respectively, from the positive $x$-axis, they are symmetrical with respect to the line segment $\overline{PA}$. The curve representing the relation $Y=F(X)$ goes through these points $A_{n-1}$, A and $A_1$.

When, now, the crank rotates clockwise about point O so that the point P reaches a point P', there must exist a specific instant at which the point A becomes farthest from point O. Thus, when the line segment $\overline{OP}$ corresponding to the crank turns about point O through an angle of $\theta$ with the line segment $\overline{PA}$ concurrently rotating clockwise about point P, a condition must be established instantaneously in which the line segment $\overline{PA}$ is rotated through an angle of $\Theta$ so that the point $A_1$ is moved to a point $A'_1$ and accordingly that the points O, P' and $A'_1$ are in line with each other. Under this condition, points A and $A_{n-1}$ are moved respectively to new points A' and $A'_{n-1}$ which must apparently be situated on the initial curve corresponding to $Y=F(X)$. Thus, the points $A_{n-1}$, $A'_{n-1}$, A, A', $A_1$ and $A'_1$ are all constant points lying on the curve $Y=F(X)$. If the point P is turned through an angle of $-\theta$, i.e., counter clockwise from the positive x-axis, then a point $A''_{n-1}$ is the farthest point from point O. Since, in this condition, points A'' and $A''_1$ are determined and since all the specific points now established are symmetrical with respect to the positive x-axis, the constant points on the curve $Y=F(X)$ are symmetrical with respect to the x-axis.

It will thus be noticed that the initial farthest point A and subsequent farthest points $A'_1$ and $A''_{n-1}$ from point O are in agreement with tops of the curve $Y=F(X)$. For the purpose that those tops of the curve $Y=F(X)$ which provide the constant points of this curve fulfil the condition for symmetry with respect to the x-axis, they must at least be disposed in a similar positional relationship with respect to the center O of the output shaft. When a case is to be taken into account in which the line segments $\overline{OP}$ and $\overline{PA}$ turn in the same direction, it must be borne in mind that an angle between the line segments $\overline{A'_1 O}$ and $\overline{OA}$ is greater than $2\pi/n$, thus $$\angle A'_1 OA \frac{2\pi}{n}$$

as will be evident from FIG. 3.

A requirement is consequently imposed that the number of the convex parts of the curve $Y=F(X)$ must be smaller than the number of the lobes or apices of the rotor This means that the fact that curve $Y=F(X)$ is provided with an $n-1$ number of convex parts when the rotor has an $n$ number of apices is a sufficient condition to meet this requirement.

It has been assumed that the curve $Y=F(X)$ can be chosen arbitarily but, from the above analysis, it is now apparent that such assumption holds with a limitation that the curve must pass through a certain number of constant points. A segment intervening between two adjacent constant points of such curve may be constructed as part of any desired curve.

When the curve $Y=F(X)$ is thus determined on condition that the above mentioned limitation is satisfied, the relation $\Theta=f(\theta)$ will be immediately deduced therefrom thereby clearly bringing out the required mechanism of the rotary engine.

Where it is desired that the relation $\Theta=(\theta)$ be initially given, such relation must be chosen in a manner that the relation is periodic of $$\frac{2\pi}{n-1}$$

so that the condition for symmetry may be fulfilled.

With the above described conditions in mind, the following discussion is directed, in more detail, to the case where $n=3$. It should, however, be remembered that the results to be yielded from such discussion apply to cases where the number $n$ is chosen otherwise.

LOCUS OF APICES OF ROTOR

Consideration will herein be given to the motions of the apices of the rotor, viz, to generating curves to define the contoured chamber in the center housing of the rotary engine.

The center of the rotor rotates about the center, O of the output shaft with an angular velocity of $d\theta/dt$ while the rotor per se rotates about its center P with an angular velocity of $d\Theta/dt$. Here, the values of $\theta$ and $\Theta$ are assumed to be positive when the rotations of the rotor about the output shaft and the crank pin, respectively, are clockwise while fulfilling the relation $\Theta=f(\theta)$. From the assumption that $n=3$, it follows according to the above described conditions that the locus curve $Y=F(X)$ to be traced by the apices of the rotor must have two convex parts or lobes.

Figure 4:
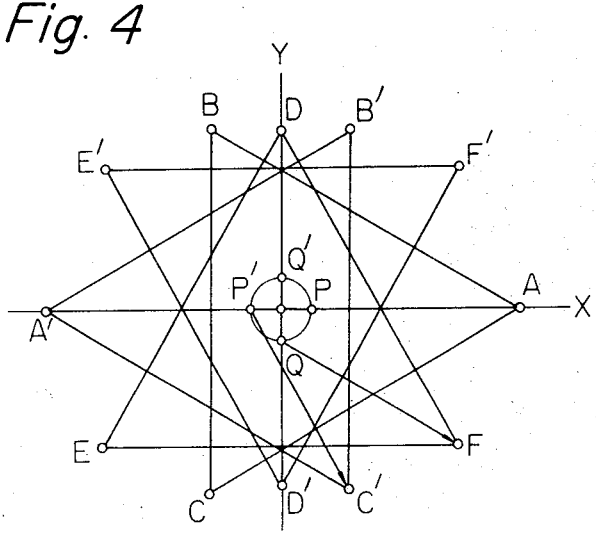
FIG. 4 is a diagram showing the constant point through which the locus curve traced by the apices, assumed to be three in number, of the rotor in the rotary motion device in general.

Referring to FIG. 4, four sets of points A, B and C; A', B', and C'; D, E and F; and D'E' and F' denote apices of the rotor in different rotational positions. When, thus, the apices of the rotor are located at points A, B and C, the center P of the rotor and the apex at point A are situated on the x-axis and, furthermore, the point A is the farthest point from point O. From the condition for symmetry, the points P' and A' must be exactly on the opposite side to the points P and A. Points A, B and C and points A', B' and C' are determined in this manner. The locus curve to be traced by the apices of the rotor must go through the thus determined points A, B' B, A', C and C'. While point P is travelling to point P', it passes through the lowermost point on the negative y-axis, when the apex D of the rotor must lie on the positive y-axis and become nearest to point O. This nearest point is in apparently agreement with one of concave parts of the locus curves. With the position of the rotor thus established, the points D, E and F and the points D', E' and F' which are in symmetrical relationship to the former will be accordingly determined. FIG. 4 indicates the relationship between the points obtained in this manner. The locus curve traced by the apices of the rotor must go through the shown points A, F, C', D', D, E, A', E', B, D, B' and F' in this sequence, as will be understood from the previous discussion.

It therefore follows that the apex A should go through points, A, F, C', . . . as the center P of the rotor rotates about point O so that the crank vector $\overline{PA}$ reaches a line segment $\overline{Q'D'}$ as the crank rotates through points P, Q, P' and Q', as seen in FIG. 4.

Figure 5:
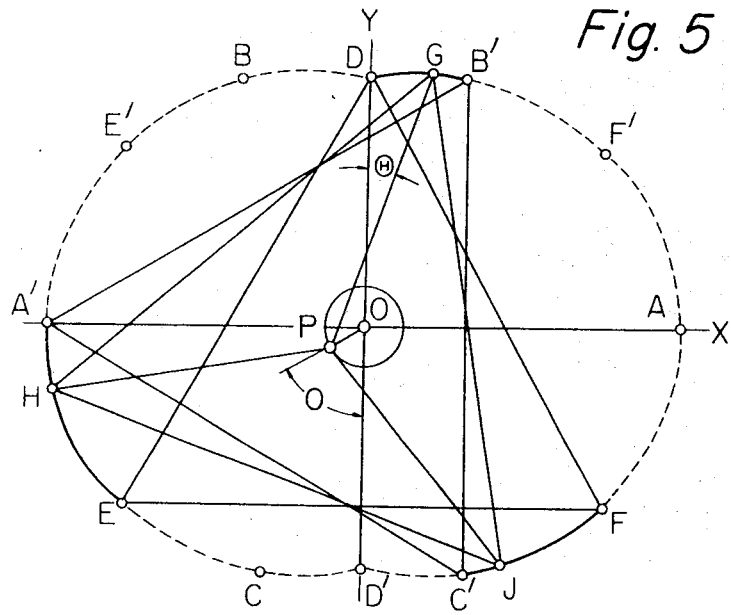
FIG. 5 is a diagram illustrating the manner in which the locus curve of the apices of the rotor is to be determined.

Since, as will be understood from the above discussion, the locus curve to be traced by the apices of the rotor must pass through the constant points in order that the condition for symmetry be satisfied, the locus curve, or accordingly the curve to dictate boundary of the contoured chamber in the center housing of the rotary engine, is a curve joining these constant points. An epitrochoid curve is one of the curves having such characteristics. In FIG. 5, points G, H and J denote apices of the rotor which is moving from the position with the apices located at D, E and F to the position with the apices located at A',B' and C'.

As the point G moves on the curved segment DB', the remaining points H and J of apices trace curved segments E' and FC', respectively. If, therefore, the curved segment DB' is given, then the curved segments EA' and FC' will be determined by the particular segment DB'.

Once the curved segment A'E is determined, a curved segment A'E' which is symmetrical to the segment A'E with respect to the negative x-axis will be given and this, in turn, decides on the relationship between points F, A and F'. Curved segments CE, E'B ad B'F' will be obtained in a similar manner. The curved segment DB', on the other hand, determines curved segments D'C' and accordingly BD and CD' as will be apparent from observation of FIG. 5. The conclusion is, therefore, that if the curved segment DB' is given then all the remaining component segments and, hence, the locus curve to be traced by the speces of the rotor can be determined exclusively. The following discussion deals with the manner of obtaining this particular segment DB'.

LOCUS CURVE TRACED BY THE APICES OF ROTOR

To determine the locus curve to be traced by the apices of the rotor is to define a generating curve for contour of the contoured chamber in the center housing of the rotary engine. Basic equations should therefore be first set up for this purpose.

(1) Deduction of basic equations

First let the arbitrary curved segment DB' be represented by the equation $Y=F(X)$ and the complete locus curve to be traced by the apices of the rotor be represented by the equation $Y=G(X)$. In consideration of the fact that the angle which the line segment $\overline{PG}$ joining the apex G and center P of the rotor makes with the positive y-axis when the center P of the rotor rotates about the point O through the angle of $\theta$ is $\Theta$, the following equations are obtained as previously discussed:

$$X=-a\cdot\sin\theta+L\cdot\sin\Theta \quad \text{(Eq. 3)}$$
$$Y=-a\cdot\cos\theta+L\cdot\cos\Theta$$

and
$$Y=F(X)$$

Substituting the first two of the expressions of Eq.3 in the last for eliminating X and Y, there results $$-a\cdot\cos\theta+L\cdot\cos\Theta=F(-a\cdot\sin\theta+L\cdot\sin\Theta) \quad \text{(Eq. 4)}$$

Thus, on condition that the angle $\Theta$ is related to the angle in a manner dictated by Eq. 4, the curved segment DB' is represented by $$X=-a\cdot\sin\theta+L\cdot\sin\Theta \quad \text{(Eq. 5)}$$
$$Y=-a\cdot\cos\theta+L\cdot\cos\Theta$$

Because the point H as labelled in FIG. 5 is one of the vertices of a regular triangle having a center of gravity at point P, when point G moves on the curved segment DB', then the curved segment A'E traced by this point H may be written in the form $$X=-a\cdot\sin\theta-L\cdot\sin\left(\frac{\pi}{3}+\Theta\right)$$
$$Y=-a\cdot\cos\theta-L\cdot\cos\left(\frac{\pi}{3}+\Theta\right)$$
$$-a\cdot\cos\theta+L\cdot\cos\Theta=F(-a\cdot\sin\theta+L\cdot\sin\Theta) \quad \text{(Eq. 6)}$$

Likewise, the curved segment C'F drawn by the point J may be written $$X=-a\cdot\sin\theta+L\cdot\sin\left(\frac{\pi}{3}-\Theta\right)$$
$$Y=-a\cdot\cos\theta-L\cdot\cos\left(\frac{\pi}{3}-\Theta\right)$$
$$-a\cdot\cos\theta+L\cdot\cos\Theta=F(-a\cdot\sin\theta+L\cdot\sin\Theta) \quad \text{(Eq. 7)}$$

The curved segment C'D on the other hand may be written, from the fact that it is symmetrical to the curved segment DB' with respect to the x-axis, in the form $$X=-a\cdot\sin\theta+L\cdot\sin\Theta$$
$$Y=-a\cdot\cos\theta-L\cdot\cos\Theta$$
$$-a\cdot\cos\theta+L\cdot\cos\Theta=F(-a\cdot\sin\theta+L\cdot\sin\Theta) \quad \text{(Eq. 8)}$$

The behaviours of the individual curved segments will now be considered in the following.

Differentiation of Eq. 5 with respect to the angle $\theta$ gives $$\frac{DY}{DX}=\frac{-L\cdot\sin\Theta\cdot\frac{d\Theta}{d\theta}+a\cdot\sin\theta}{L\cdot\cos\Theta\cdot\frac{d\Theta}{d\theta}-a\cdot\cos\theta} \quad \text{(Eq. 9)}$$

When $\theta=0$, then $\Theta=0$, so that if $Y_{(\theta=0)}=Y_0$ $$Y_0=L-a \quad \text{(Eq. 10)}$$

when
$$\theta=\frac{\pi}{2}$$

then, from the condition for symmetry and as will be apparent from the relationship shown in FIG. 4, $$\Theta=\frac{\pi}{6}$$

Hence $$X_{\left(\theta=\frac{\pi}{2}\right)}=\frac{L}{2}-a$$

$$X_{\left(\theta=\frac{\pi}{2}\right)}=L\cdot\cos\frac{\pi}{6} \quad \text{(Eq. 11)}$$

From this, it follows that $$\left(\frac{dY}{dX}\right)_{\theta=0}=\frac{0}{L\frac{d\Theta}{d\theta}-a}=0 \quad \text{(Eq. 12)}$$

which yields a cusp when $d\Theta/d\theta=a/L$. Generally, however, it is assumed that $d\Theta/d\theta \neq a/L$.

The above discussion thus shows that the curve $$Y=F(X)$$

to be initially obtained must satisfy the condition $$\left(\frac{dY}{dX}\right)_{x=0}=0 \quad \text{(Eq. 13)}$$

Whereas, $$\left(\frac{dY}{dX}\right)_{\theta=\frac{\pi}{2}}=\frac{-L\cdot\sin\frac{\pi}{6}\cdot\frac{d\Theta}{d\theta}+a}{L\cdot\cos\frac{\pi}{6}\cdot\frac{d\Theta}{d\theta}} \quad \text{(Eq. 14)}$$

Differentiating Eq. 7 for the curved segment C'F with respect to the angle $\theta$, there results $$\frac{dY}{dX}=\frac{-L\cdot\sin\left(\frac{\pi}{3}-\Theta\right)\cdot\frac{d\Theta}{d\theta}+a\cdot\sin\theta}{L\cdot\cos\left(\frac{\pi}{3}-\Theta\right)\cdot\frac{d\Theta}{d\theta}-a\cdot\cos\theta} \quad \text{(Eq. 15)}$$

If $\theta=\pi/2$, there is obtained $$\left(\frac{dY}{dX}\right)_{\theta=\frac{\pi}{2}}=\frac{-L\cdot\sin\frac{\pi}{6}\cdot\frac{d\Theta}{d\theta}+a}{-L\cdot\cos\frac{\pi}{6}\cdot\frac{d\Theta}{d\theta}} \quad \text{(Eq. 16)}$$

Considering the curved segments C'F and B'F' are symmetrical with respect to the x-axis, the differential coefficient of the curved segment B'F' is, when $\theta=\pi/2$, expressed as:

$$\left(\frac{dY}{dX}\right)_{\theta=\frac{\pi}{2}}=\frac{-L\cdot\sin\frac{\pi}{6}\cdot\frac{d\Theta}{d\theta}+a}{L\cdot\cos\frac{\pi}{6}\cdot\frac{d\Theta}{d\theta}} \quad \text{(Eq. 17)}$$

The value of this differential coefficient equals the differential coefficient of the curved segment DB' as taken when $\theta=\pi/2$. This will mean that the two curved segments DB' and B'F' have a common tangent when $\theta=\pi/2$. These curved segments DB' and B'F' thus merge into each other smooth at point B' by reason of their common tangent.

Also, differentiation of Eq. 6 concerning the curved segment A'E with respect to the angle $\theta$ gives $$\frac{dY}{dX} = \frac{-L\cdot\sin\left(\frac{\pi}{3}+\Theta\right)\frac{d\Theta}{d\theta} - a\cdot\sin\theta}{L\cdot\cos\left(\frac{\pi}{3}+\Theta\right)\frac{d\Theta}{d\theta} + a\cdot\cos\theta} \quad \text{(Eq. 18)}$$

Hence, when $\theta=\pi/2$, then $$\left(\frac{dY}{dX}\right)_{\theta=\frac{\pi}{2}} = \frac{-L\cdot\frac{d\Theta}{d\theta}-a}{0} = \text{infinite} \quad \text{(Eq. 19)}$$

where $$L\cdot\frac{d\Theta}{d\theta}+a \neq 0$$

Eq. 19 thus obtained will show that the generated curved segment EA' possesses at point A' a tangent which is perpendicular to the x-axis and, as such, the imposed condition for symmetry is sufficiently fulfilled.

The conclusion is now drawn from the above discussion that the locus curve $Y=F(X)$ must be chosen in a manner to satisfy the following conditions:
Condition I: The locus curve must pass through point $(O, L-a)$, according to Eq. 10.
Condition II: $\theta=0$, $(dY/dX)_{\theta=0}=0$ according to Eq. 12.
Condition III: When $\theta=\pi/2$, the locus curve must pass through point $$\left(\frac{L}{2}-a, L\cdot\sin\frac{\pi}{3}\right)$$

according to Eq. 11.

With the conditions thus imposed, the complete locus curve $Y=G(X)$ to be traced by the apices of the rotor can be obtained, when the curve DB' is given, as follows:

(Eq. 20)
For the curved segment BD'

$$X = -a\cdot\sin\theta + L\cdot\sin\Theta$$
$$Y = -a\cdot\cos\theta + L\cdot\cos\Theta$$

in which $\theta$ ranges from 0 to $\pi/2$.

(Eq. 21)
For the curved segment B'F', $$X = -a\cdot\sin\theta + L\cdot\sin(\pi/3-\Theta)$$
$$Y = a\cdot\cos\theta + L\cdot\cos(\pi/3-\Theta)$$

in which $\theta$ ranges from $\pi/2$ to 0.

(Eq. 22)
For the cured segment F'A, $$X = a\cdot\sin\theta + L\cdot\sin(\pi/3+\Theta)$$
$$Y = a\cdot\cos\theta + L\cdot\cos(\pi/3+\Theta)$$

in which $\theta$ ranges from 0 to $\pi/2$.

(Eq. 23)
For the curved segment AF, $$X = a\cdot\sin\theta + L\cdot\sin(\pi/3+\Theta)$$
$$Y = -a\cdot\cos\theta - L\cdot\cos(\pi/3+\Theta)$$

in which $\theta$ ranges from $\pi/2$ to 0.

(Eq. 24)
For the curved segment FC', $$X = -a\cdot\sin\theta + L\cdot\sin(\pi/3-\Theta)$$
$$Y = -a\cdot\cos\theta - L\cdot\cos(\pi/3-\Theta)$$

in which $\theta$ ranges from 0 to $\theta/2$.

(Eq. 25)
For the curved segment C'D', $$X = -a\cdot\sin\theta + L\cdot\sin\Theta$$
$$Y = a\cdot\cos\theta - L\cdot\cos\Theta$$

in which 0 ranges from $\pi/2$ to 0.

(Eq. 26)

For the curved segment D'C, $$X = a\cdot\sin\theta - L\cdot\sin\Theta$$
$$Y = a\cdot\cos\theta - L\cdot\cos\Theta$$

in which $\theta$ ranges from 0 to $\pi/2$.

(Eq. 27)
For the curved segment CE, $$X = a\cdot\sin\theta - L\cdot\sin(\pi/3-\Theta)$$
$$Y = -a\cdot\cos\theta - L\cdot\cos(\pi/3-\Theta)$$

in which $\theta$ ranges from $\pi/2$ to 0.

(Eq. 28)
For the curved segment EA', $$X = -a\cdot\sin\theta - L\cdot\sin(\pi/3+\Theta)$$
$$Y = -a\cdot\cos\theta - L\cdot\cos(\pi/3+\Theta)$$

in which $\theta$ ranges from 0 to $\pi/2$.

(Eq. 29)
For the curved segment A'E', $$X = -a\cdot\sin\theta - L\cdot\sin(\pi/3+\Theta)$$
$$Y = a\cdot\cos\theta + L\cdot\cos(\pi/3+\Theta)$$

in which $\theta$ ranges from $\pi/2$ to 0.

(Eq. 30)
For the curved segment E'B', $$X = a\cdot\sin\theta - L\cdot\sin(\pi/3-\Theta)$$
$$Y = a\cdot\cos\theta + L\cdot\cos(\pi/3-\Theta)$$

in which $\theta$ ranges from 0 to $\pi/2$.

For the curved segment BD merging into the initial segment DB', (Eq. 31)

$$X = a\cdot\sin\theta - L\cdot\sin\Theta$$
$$Y = a\cdot\cos\theta + L\cdot\cos\Theta$$

in which $\theta$ ranges from $\pi/2$ to 0.

These Eqs. 20 to 31 yield the required continuous curve $Y=G(X)$. This curve will satisfy the conditions required to provide the generating curve for the contour of the center housing of the rotary engine.

(2) Contour Curves of Gears

Figure 6:
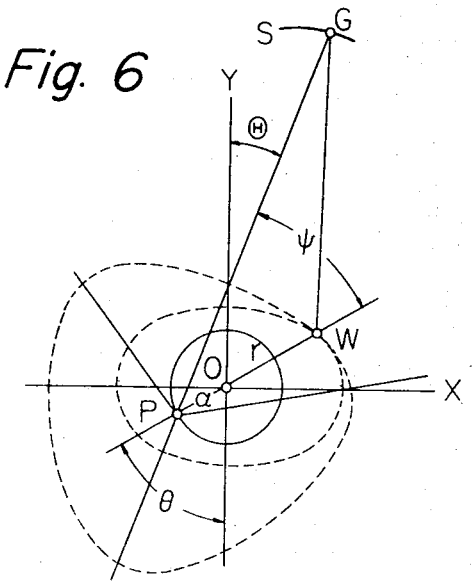
FIG. 6 is a diagram serving to assist in the understanding of the mathematical deduction of the contour curves for the gears to be incorporated in the rotary motion device according to the present invention.

It is well known in the art of the gear mechanism that when one piece drives another by direct sliding contact at a constant or variable velocity the common normal to the two contacting surfaces passes through the pitch point. FIG. 6 illustrates such relation in which the point of contact between the two pieces is denoted by G and the pitch point by W. The shown relation is taken in conjunction with the rotor and the contoured chamber in the center housing of the rotary engine. The gears herein mentioned thus include an externally toothed stationary gear having its center common to the center of the engine output shaft and held stationary relative to the center housing and an internally toothed gear integral with or formed on the rotor and having its center common to the center of the rotor itself. The internally toothed gear is in constant mesh with the externally toothed gear and moves therearound as the rotor rotates about its axis and revolves around the center of the output shaft.

Referring now to FIG. 6, the pitch point W of the gears lies on an extension of the line segment $\overline{PO}$ so that, writing the line segment $\overline{OW}$ as $r$, the following equations should hold:

$$\frac{a}{a+r} = \frac{d\Theta/dt}{d\theta/dt} = \frac{d\Theta}{d\theta} \quad \text{(Eq. 32)}$$

Between the angles $\theta$ and $\Theta$ does exist the relation that has been expressed by Eq. 4. Differentiating therefore Eq. 4 with respect to the angle $\theta$, there is obtained $$\frac{d\Theta}{d\theta} = \frac{a}{L}\cdot\frac{\frac{dF(X)}{dX}\cdot\cos\theta + \sin\theta}{\frac{dF(X)}{dX}\cdot\cos\Theta + \sin\Theta} \quad \text{(Eq. 33)}$$

Eliminating $d\Theta/d\theta$ from Eqs. 32 and 33, $$r = \frac{\sin\Theta + \frac{dY}{dX}\cdot\cos\Theta}{\sin\theta + \frac{dY}{dX}\cdot\cos\theta} \quad \text{(Eq. 34)}$$

This equation represents the contour curve of the stationary gear having point O as a center.

If, now, the contour curve of the internally toothed gear on the rotor is represented on a polar coordinate system by the equation $R=P(\psi)$, then it follows from the relationship shown in FIG. 6 that $$R = a+r$$
$$\psi = \theta - \Theta \quad \text{(Eq. 35)}$$

From Eq. 34, this equation may be written in the form $$R = L\cdot\frac{\sin\Theta + \frac{dY}{dX}\cdot\cos\Theta}{\sin\theta + \frac{dY}{dX}\cdot\cos\theta}$$

$$\psi = \theta - \Theta \quad \text{(Eq. 35')}$$

The function $R(\psi)$ will thus be obtained which contains the angle $\theta$ as a parameter.

(2–1) An example of the contour curves of the gear corresponding to the curve $Y=F(X)$ If the locus curve to be traced by the apices of the rotor is given which is in agreement with the relation $Y=F(X)$, then the values of $\theta$ and $\Theta$ will be determined. Substitution of such values $\theta$ and $\Theta$ in Eq. 34 will give the contour curve for the externally toothed stationary gear.

An example will now be taken in which the contour curve for the gear is to be determined when the segment DB' is given as a straight line segment. In this instance, the segment DB' is parallel to the $x$-axis so that the ordinates of both the points D and B' are equal to each other, thus $$L - a = L\cdot\cos\frac{\pi}{6}$$

Hence $$L = a/\left(1 - \sqrt{\frac{3}{2}}\right) \quad \text{(Eq. 36)}$$

The line segment DB' is represented by the equation $$Y = L - a = -a\cdot\cos\theta + L\cdot\cos\Theta \quad \text{(Eq. 37)}$$

Differentiating Eq. 37 with respect to the angle $\theta$, there results $$\frac{d\Theta}{d\theta} = \frac{a}{L}\cdot\frac{\sin\theta}{\sin\Theta} \quad \text{(Eq. 38)}$$

Substituting Eq. 38 in Eq. 32, $$r = L\cdot\frac{\sin\Theta}{\sin\theta}$$

so that $$r = \sqrt{\frac{L^2 - (L-a+a\cdot\cos\theta)^2}{\sin\theta}} - a \quad \text{(Eq. 39)}$$

From this it follows that when $\theta=0$, $$r_{(\theta=0)} = a\left(\sqrt{\frac{L}{a}} - 1\right) \quad \text{(Eq. 40)}$$

and when $\theta = \pi/2$, $$r_{\left(\theta=\frac{\pi}{2}\right)} = a\sqrt{2\left(\frac{L}{a}-1\right)} - a \quad \text{(Eq. 41)}$$

From these Eqs. 40 and 41, it is understood that the contour curve of the stationary gear is constructed as a quasi-ellipse having a minor semi-axis of $r_{(\theta=0)}$ and major semi-axis of $$r\left(\theta=\frac{\pi}{2}\right)$$

and represented by Eq. 39.

By Eq. 37 and the equation $dY/dX=0$, Eq. 35' may be written in the following form:

$$R = \sqrt{\frac{L^2 - (L-a+a\cdot\cos\theta)^2}{\sin\theta}}$$

$$\psi = \theta - \cos^{-1}\left\{1 - \frac{a}{L}(1-\cos\theta)\right\} \quad \text{(Eq. 42)}$$

This Eq. 42 is considered to provide an internal contour of an internally toothed gear which is formed in the rotor to mesh with the externally toothed stationary gear. Thus, when $\theta=0$, then $\psi=0$ and $$R_{\psi=0} = a\sqrt{\frac{L}{a}}$$

and, when $\theta = \pi/2$, then $\psi = \pi/3$ and $$R_{(\psi=\pi/3)} = a\sqrt{2(L/a)-1}$$

Figure 7:
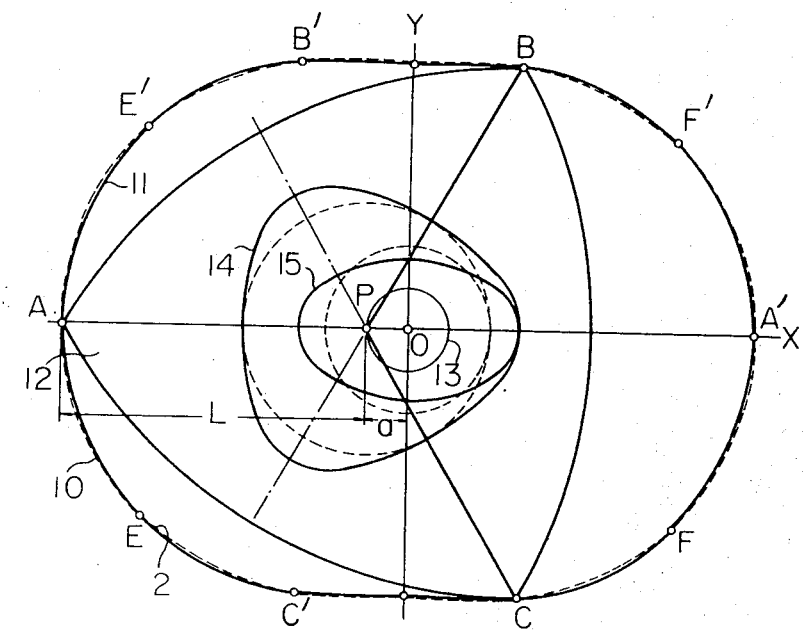
FIG. 7 is a diagram showing a section, taken in a plane transverse to the axis of the rotor, of the rotary motion device according to the present invention, in comparison with the epitrochoidally contoured chamber of the prior art Wankel rotary engine as indicated by dashed curves.

Examples of the curves defining the external contours of the rotor and the stationary gear and the internal contour of the contoured chamber of the center housing of the rotary engine as obtained when the segment DB' is made rectilinear are indicated by solid curves in FIG. 7 in comparison with the corresponding curves obtained when such segment is taken as an epitrochoid curve as indicated by dashed curves. The basic construction of the rotary engine herein shown is such that it comprises a center housing 10 in which a contoured chamber 11 is formed and a three-lobed rotor 12 slidably received within the contoured chamber. The rotor 12 is rotatable with an output shaft 13 which is located at the center of a side housing, not shown, and is formed with an internally toothed gear 14 having a center at the center P of the rotor per se. This internally toothed gear 14 is in mesh with an externally toothed stationary gear 15 which is fixed on the side housing and which has a contour resulting from a quasi-elliptical curve. Thus, the contour of the internally toothed gear 14 is dictated by the relation expressed by Eq. 42 while the contour of the externally toothed stationary gear 15 by the relation expressed by Eq. 39. The rotor 12 rotated about its center P and concurrently revolves around the center O of the engine output shaft 13 as the internally toothed gear 14 moves on the externally toothed stationary gear 15.

(2.2) Relationship between the locus curve of the stationary gear and the locus curve of the apices of the rotor or the generating curve of the contoured chamber Suppose the locus curve of the stationary gear 15 is given, with the angle $\theta$ used as a parameter, by $$r = r(\theta) \quad \text{(Eq. 43)}$$

then, since the value $r$ is related to the value $\theta$, the angle $\Theta$ will be obtained from the following equation:

$$\Theta = \int_0^\theta \left(\frac{a}{r+a}\right) d\theta \quad \text{(Eq. 44)}$$

The locus curve of one apex of the rotor through the segment DB' is expressed as $$X = -a\cdot\sin\theta + L\cdot\sin\Theta$$

and $$Y = -a\cdot\cos\theta + L\cdot\cos\Theta$$

The curves defining the segments A'E and C'F are given as the loci of the remaining apices of the rotor and the curves defining all the other component segments are obtained from the condition for symmetry, whereupon the complete locus curve of the apices of the rotor is determined.

EXTERNAL CIRCUMFERENTIAL CURVE OF ROTOR

The external contour or external circumferential curve of the rotor is determined as an envelope generated by the movement around the rotor of the locus curve described by the apices of the rotor.

Figure 8:
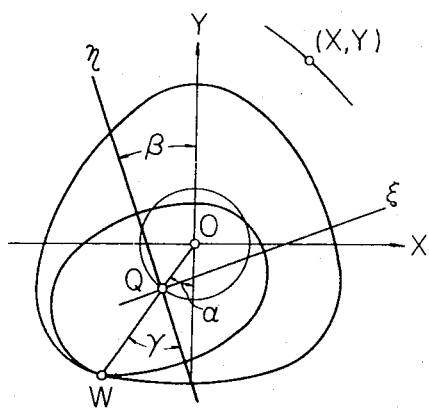
FIG. 8 is a diagram to assist in the understanding of the mathematical approach to the determination of the external contour of the rotor of the rotary motion device according to the present invention.

An enclosure will therefore be taken into consideration in which the rotor is maintained at a standstill so that the enclosure is in crank motion around the rotor. In FIG. 8, such stationary "rotor" is shown as having a center at a point $O_1$ and the enclosure as having a center at point Q, in which the point Q is in crank motion around the point $O_1$ and an angle which the line segment joining points $O_1$ and Q makes with the fixed negative y-axis is denoted by $\alpha$. It is, moreover, assumed that, while the line segment $\overline{O_1Q}$ or crank rotates through the angle of $\alpha$, the enclosure rotates through an angle of $\gamma$. If, now, the enclosure rotates through an angle of $\beta$ with respect to the rotor, there results $$\gamma = \alpha + \beta$$

so that $$\frac{d\gamma}{dt} = \frac{d\alpha}{dt} + \frac{d\beta}{dt} \quad \text{(Eq. 45)}$$

In view of the fact that the pitch point W on the locus curves of the gears and points $O_1$ and Q must be in line with each other, it follows, if the distance between the center Q of the enclosure and the pitch point W is denoted by $r$ and the radius of the crank ($=O_1Q$) by $a$, that $$\frac{d\gamma/dt}{d\alpha/dt} = \frac{r+a}{r} \quad \text{(Eq. 46)}$$

in which $r$ is a function of $\alpha$.

Substitution of Eq. 45 in Eq. 46 gives:

$$\frac{d\beta}{d\alpha} = \frac{a}{r} \quad \text{(Eq. 47)}$$

Integration of Eq. 47 with respect to $\alpha$ results in $$\beta = \int_0^\alpha (a/r) d\alpha \quad \text{(Eq. 47')}$$

so that the value $\beta$ is found to be definitely related to the value $\alpha$.

Introducing now $\xi\eta$-coordinates having an origin at point Q and with the axis of ordinate making the angle of $\beta$ with the axis of ordinate of the given $xy$-coordinates having an origin at point $O_1$, the center of the rotor, and transforming the former coordinate into the latter, the following relation holds:

$$X = \xi \cdot \cos\beta - \eta \cdot \sin\beta - a \cdot \sin\alpha$$
$$Y = \xi \cdot \sin\beta + \eta \cdot \cos\beta - a \cdot \cos\alpha \quad \text{(Eq. 48)}$$

If the curve to define the internal contour of the enclosure is assumed, on the $\xi\eta$-coordinate system to be $$\eta = f(\xi)$$

then, for $\beta$ is a function of $\alpha$ as is evident from Eq. 47', such curve will be written, for various values of $\alpha$ and on the $xy$-cordinate system, in the form $$X = X(\xi, \alpha)$$
$$Y = Y(\xi, \alpha) \quad \text{(Eq. 49)}$$

From this it follows that the envelope for the rotor must satisfy the condition expressed as $$\begin{vmatrix} \cos\beta - \frac{d\eta}{d\xi}\cdot\sin\beta, & (\xi\cdot\sin\beta + \eta\cdot\cos\beta)\frac{d\beta}{d\alpha} - a\cdot\cos\alpha \\ \sin\beta + \frac{d\eta}{d\xi}\cdot\cos\beta, & (\xi\cdot\cos\beta - \eta\cdot\sin\beta)\frac{d\beta}{d\alpha} + a\cdot\sin\alpha \end{vmatrix} = 0$$

In consideration of the fact that the value $\beta$ is definitely expressed in terms of the value $\alpha$, Eq. 49, when $\alpha$ is eliminated by means of Eq. 50, take sthe form $$X = X(\xi)$$
$$Y = Y(\xi) \quad \text{(Eq. 51)}$$

This Eq. 51 will yield the external circumferential curve of the rotor.

VARIATION IN ACCELERATION OF ROTOR

The rotor generally is moved for epicyclic motion with the velocity and acceleration varying markedly depending upon the locations of various points thereof. From Eq. 3, there hold $$Y = F(X)$$
$$X = L \cdot \sin\Theta - a \cdot \sin\theta$$

and $$Y = L \cdot \cos\Theta - a \cdot \cos\theta \cdot$$

Differentiating the latter two of these expressions with respect to the time $t$, there result $$\frac{dx}{dt} = \left( L \cdot \cos\Theta \cdot \frac{d\Theta}{d\theta} - a \cdot \cos\theta \right)$$

and $$\frac{dY}{dt} = \left( -L \cdot \sin\Theta \cdot \frac{d\Theta}{d\theta} + a \cdot \sin\theta \right) \cdot W \quad \text{(Eq. 52)}$$

where $W = d\theta/dt$.

Further differentation of Eq. 52 with respect to the time $t$ with an assumption that W is constant gives $$\frac{d^2X}{dt^2} = \left\{ L \cdot \cos\Theta \cdot \frac{d^2\Theta}{d\theta^2} - L \cdot \sin\Theta \left(\frac{d\Theta}{d\theta}\right)^2 + a \cdot \sin\theta \right\} W \cdot ^2$$

$$\frac{d^2Y}{dt^2} = \left\{ -L \cdot \sin\Theta \cdot \frac{d^2\Theta}{d\theta^2} - L \cdot \cos\Theta \left(\frac{d\Theta}{d\theta}\right)^2 + a \cdot \cos\theta \right\} \cdot W^2 \quad \text{(Eq. 53)}$$

Figure 9:
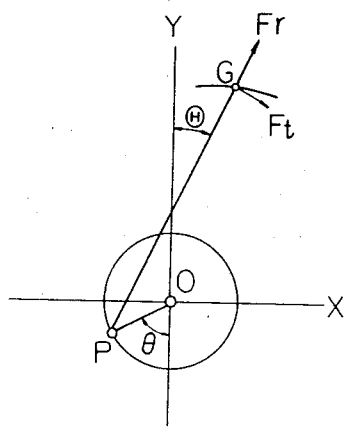
FIG. 9 is a diagram which is useful in considering the variation in the acceleration at the lobes or apices of the rotor of the rotary motion device in general.

Thus, in FIG. 9, the apex G of the rotor is subject to the acceleration which is represented by the above Eq. 53. If, therefore, a force resulting in this acceleration is decomposed into a radial component $Fr$ and a tangential component $Ft$, they will be expressed as $$Fr = \frac{d^2X}{dt^2} \cdot \sin\Theta + \frac{d^2Y}{dt^2} \cdot \cos\Theta$$

$$= \left\{ -L\left(\frac{d\Theta}{d\theta}\right)^2 + a \cdot \cos(\theta - \Theta) \right\} \cdot W^2 \quad \text{(Eq. 54)}$$

and $$Ft = \frac{d^2X}{dt^2} \cdot \cos\Theta - \frac{d^2Y}{dt^2} \cdot \sin\Theta$$

$$= \left\{ L \cdot \frac{d^2\Theta}{d\theta^2} + a \cdot \sin(\theta - \Theta) \right\} W^2 \quad \text{(Eq. 55)}$$

These Eqs. 54 and 55 clearly bring out the variation in acceleration of the rotor depending upon the locations of various points thereof. Consideration will thus be given to make clear the differences in acceleration characteristics between the Wankel rotary engines of prior art and the improved rotary engine proposed by the present invention.

(1) Wankel engines

The prior art Wankel engines use epitrochoid curves as the generating curve for the contoured chamber in the center housing. The relation $\Theta = \theta/3$ will thus invariably hold in the Wankel engines. In consequence of this relation, Eqs. 54 and 55 may be written $$Fr = \left\{-\frac{L}{9} + a \cdot \cos\left(\frac{2}{3}\theta\right)\right\} \cdot W^2 \quad \text{(Eq. 56)}$$

$$Ft = a \cdot \sin\left(\frac{2}{3}\theta\right) \cdot W^2$$

This Eq. 56 apparently shows that variation in the acceleration is invited even though it provides constant velocity motions. From Eq. 56 the maximum value of the radial component $Fr$ is $$Fr_{(max.)} = -\frac{L}{9} + a$$

so that, if $L/a < 9$ the value of $Fr$ will change its sign in the neighbourhood of $\theta = 0$. This is interpreted by the fact that, in the actual mechanism of the rotary engine, it is difficult to have satisfactory sealing attained between the rotor lobes and the center housing.

(2) Engine embodying the invention

The rotary engine according to the present invention is as previously described, constructed in a manner that the two congruent and symmetrical component curves generating the internal countour of the contoured chamber in the center housing link together through straight lines. Since, thus, the segment B'D is constructed as a straight line, viz, in a non-epitrochoidal configuration, the relation holds which is expressed as $$L \cdot \cos \Theta + a \cdot (1 - \cos \theta) = L \quad \text{(Eq. 57)}$$

Differentiating this Eq. 57 with respect to $\theta$, there results $$\frac{d\Theta}{d\theta} = \frac{a}{L} \cdot \frac{\sin \theta}{\sin \Theta}$$

Hence $$\frac{d^2\Theta}{d\theta^2} = \frac{-L \cdot \cos \Theta \left(\frac{a}{L} \cdot \frac{\sin \theta}{\sin \Theta}\right)^2 + a \cdot \cos \theta}{L \cdot \sin \Theta} \quad \text{(Eq. 58)}$$

From Eq. 58, Eqs. 54 and 55 may be written in the form $$Fr = \left\{-\frac{a^2}{L}\left(\frac{\sin \theta}{\sin \Theta}\right)^2 + a \cdot \cos(\theta - \Theta)\right\} \cdot W^2 \quad \text{(Eq. 59)}$$

$$Ft = \left\{\frac{-L \cdot \cos \Theta \left(\frac{a}{L} \cdot \frac{\sin \theta}{\sin \Theta}\right)^2 + a \cdot \cos \theta}{\sin \Theta} + a \cdot \sin(\theta - \Theta)\right\} \cdot W^2 \quad \text{(Eq. 60)}$$

for $$\cos \Theta = 1 - \frac{a}{L}(1 - \cos \theta)$$

The above Eqs. 59 and 60 may also be written in the forms $$Fr = \left\{-L \cdot \frac{1 - \sin^2\left(\frac{\theta}{2}\right)}{\frac{L}{a} - \sin^2\left(\frac{\theta}{2}\right)} + a \cdot \cos(\theta - \Theta)\right\} \cdot W^2 \quad \text{(Eq. 59')}$$

$$Ft = \left\{-\frac{(L-a) \sin \frac{\theta}{2}}{2\left(\frac{a}{L}\right)\left(\frac{L}{a} - \sin^2\left(\frac{\theta}{2}\right)\right)^{3/2}} + a \cdot \sin(\theta - \Theta)\right\} \cdot W^2 \quad \text{(Eq. 60')}$$

When, thus, $\theta = 0$, then there result $$(Fr)_{\theta=0} = 0$$
$$(Ft)_{\theta=0} = 0$$

and also $$\left(\frac{dFr}{d\theta}\right)_{\theta=0} = 0 \quad \text{(Eq. 61)}$$

From this Eq. 61, it is apparent that the radial component $Fr$ assumes an extreme value at $\theta = 0$ and does not change its sign in the neighbourhood of $\theta = 0$. This will contribute to improving the tight sealing between the lobes of the rotor and the mating wall of the contoured chamber in the center housing.

Having thus described a preferred embodiment of the present invention, it should be borne in mind that such solely by way of example. Although, especially, the generating curves for the contoured chamber in the center housing have been herein described as merging into each other through straight lines. They may be linked together through curves having a sufficiently large radius of curvature which may constitute an approximately rectilinear curve, as will be understood clearly from the mathematical discussions hereinbefore given.

It should also be remembered that, although the description has been largely directed to the engines, the gist of the present invention may apply to any devices acting upon the principle of rotary motion such as the rotary pumps and rotary motors.

What is claimed is:

1. In a rotary motion device including a chamber structure which is formed with a contoured chamber having an internal contour resulting from a closed continuous curve, a rotor having at least two substantially equidistantly and equiangularly spaced lobes and slidably received within said contoured chamber at apices of said lobes, said rotor being rotatable about its center and revolvable around a center of said contoured chamber, an externally toothed gear held stationary relative to said chamber structure and having a center which is common to the center of said contoured chamber, and an internally toothed gear which is fast on said rotor and which is in constant mesh with said externally toothed gear, the improvement which comprises said closed continuous curve consisting of substantially congruent and symmetrical component curves which are joined together through substantially straight segments, the number of said component curves being smaller by one than the number of said lobes of the rotor.

2. The improvement according to claim 1, in which said externally toothed gear has an external contour resulting from a closed, generally non-circular curve having a center which is common to the center of said contoured chamber.

3. The improvement according to claim 2, in which said generally non-circular curve is represented by an equation which is written in the form $$r = L \cdot \frac{\sin \Theta + \frac{dF(X)}{dX} \cdot \cos \Theta}{\sin \theta + \frac{dF(X)}{dX} \cdot \cos \theta} - a$$

where
  $r$: the distance between the center of said contoured chamber and a pitch point of said external and internal gears;
  $L$: the distance between the center and each of the apices of said rotor;
  $\Theta$: the rotational angle of each of the apices of the rotor about its center;
  $\theta$: the rotational angle of the center of the rotor about the center of said contoured chamber; and
  $a$: the distance between the centers of said rotor and said contoured chamber;

and where $dF(X)/dX$ is given by $$\frac{dF(X)}{dX} = \frac{-L \cdot \sin\Theta \frac{d\Theta}{d\theta} + a \cdot \sin\theta}{L \cdot \cos\Theta \frac{d\Theta}{d\theta} - a \cdot \cos\theta}$$

4. The improvement according to claim 2, in which said internally toothed gear has an internal contour resulting from a closed, generally non-circular curve having a center which is common to the center of said rotor.

5. The improvement according to claim 4, in which said generally non-circular curve is represented by an equation $R=P(\psi)$ in which $$R = L \cdot \frac{\sin\Theta + \frac{dF(X)}{dX} \cdot \cos\Theta}{\sin\theta + \frac{dF(X)}{dX} \cdot \cos\theta}$$

and $$\Psi = \theta - \Theta$$

where

L: the distance between the center of said contoured chamber and a pitch point of said external and internal gears;

Θ: the rotational angle of each of said apices of the rotor about its center; and θ: the rotational angle of the center of the rotor about the center of said contoured chamber;

and where $dF(X)/dX$ is given, when $a$ denotes the distance between the centers of said rotor and said contoured chamber, by $$\frac{dF(X)}{dX} = \frac{-L \cdot \sin\Theta \frac{d\Theta}{d\theta} + a \cdot \sin\theta}{L \cdot \cos\Theta \frac{d\Theta}{d\theta} - a \cdot \cos\theta}$$

6. The improvement according to claim 1, in which said substantially straight segments are given by an equation $Y=F(X)$ in which $$F(X)_{x=0} = L-a \text{ and } \left(\frac{dY}{dX}\right)_{x=0} = 0$$

where

L: the distance between the center of said contoured chamber and a pitch point of said external and internal gears; and a: the distance between the centers of the rotor and contoured chamber;

and where $$X = -a \cdot \sin\theta + L \cdot \sin\Theta$$

and $$F(X) = -a \cdot \cos\theta + L \cdot \cos\Theta$$

in which

θ: the rotational angle of the center of the rotor about the center of said contoured chamber; and Θ: the rotational angle of each of said apices of the rotor about its center.

7. The improvement according to claim 6, in which said externally toothed gear has an external contour resulting from a generally quasi-elliptical curve which is represented by an equation $$r = \sqrt{\frac{L^2 - (L-a+a \cdot \cos\theta)^2}{\sin\theta}} - a$$

where $r$ is the distance between the center of said contoured chamber and a pitch point of said external and internal gears.

8. The improvement according to claim 6, in which said internally toothed gear has an internal contour resulting from a curve which is represented by an equation $R=F(\psi)$ in which $$R = \sqrt{\frac{L^2 - (L-a+a \cdot \cos\theta)^2}{\sin\theta}} - a$$

and $$\Psi = \theta - \cos^{-1}\left\{1 - \frac{a}{L}(1-\cos\theta)\right\}$$

9. The improvement according to claim 6, in which said internally toothed gear has an internal contour resulting from a circle which is eccentric with respect to the center of said rotor.

10. A rotary engine comprising a center housing which is formed with a contoured chamber having an internal contour resulting from a two-linked closed continuous curve which consists of a pair of substantially congruent and symmetrical component curves which are joined together through substantially straight segments, a rotor having substantially equidistantly and equangularly spaced three lobes and slidably received within said contoured chamber at apices of said lobes, said rotor being rotatable about its center and revolvable around a center of said contoured chamber, side walls intermediate adjacent two of said lobes and a surrounding internal wall of said contoured chamber defining combustion chambers of said engine, an externally toothed gear held stationary relative to said center housing and having a center which is common to the center of said contoured housing, an internally toothed gear which is fast on said rotor and which is in constant mesh with said externally toothed gear, and an output shaft connected to said rotor at the center of said contoured housing.

11. A rotary engine according to claim 10, in which said externally and internally toothed gears respectively have external and internal contours which result from closed generally non-circular curves.

12. A rotary engine according to claim 11, in which the external contour of said externally toothed gear results from a quasi-elliptical curve having a center which is common to the center of said contoured chamber.

13. A rotary engine according to claim 10, in which said internally toothed gear has an internal contour resulting form a circle which is eccentric with respect to the center of said rotor.

References Cited

UNITED STATES PATENTS 3,102,492    9/1963    Bentele et al. ........ 418—150

CORNELIUS J. HUSAR, Primary Examiner